(12) United States Patent
O'Gorman

(10) Patent No.: US 12,518,345 B2
(45) Date of Patent: Jan. 6, 2026

(54) ACTIVITY DETECTION USING VIDEO ANALYSIS

(71) Applicant: Nokia Solutions and Networks Oy, Espoo (FI)

(72) Inventor: Lawrence O'Gorman, Madison, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 295 days.

(21) Appl. No.: 18/307,086

(22) Filed: Apr. 26, 2023

(65) Prior Publication Data

US 2023/0351565 A1  Nov. 2, 2023

(30) Foreign Application Priority Data

Apr. 29, 2022  (FI) ..................................... 20225367

(51) Int. Cl.
  *G06T 5/20*  (2006.01)
  *B25J 9/16*  (2006.01)
  *G06T 5/70*  (2024.01)
  *G06V 20/40*  (2022.01)

(52) U.S. Cl.
  CPC ............... *G06T 5/20* (2013.01); *B25J 9/1664* (2013.01); *G06T 5/70* (2024.01); *G06V 20/44* (2022.01)

(58) Field of Classification Search
  None
  See application file for complete search history.

(56) References Cited

U.S. PATENT DOCUMENTS

| | | | |
|---|---|---|---|
| 5,047,850 A * | 9/1991 | Ishii | H04N 5/145 348/E5.066 |
| 6,215,399 B1 | 4/2001 | Shpater | |
| 9,256,955 B2 | 2/2016 | O'Gorman et al. | |
| 2007/0140587 A1 | 6/2007 | Wong et al. | |
| 2008/0291265 A1 * | 11/2008 | Wagner | H04N 7/152 348/14.16 |

(Continued)

OTHER PUBLICATIONS

M. Okade and P. K. Biswas, "Fast camera motion estimation using discrete wavelet transform on block motion vectors," 2012 Picture Coding Symposium, Krakow, Poland, 2012, pp. 333-336, doi: 10.1109/PCS.2012.6213314. (Year: 2012).*

(Continued)

*Primary Examiner* — Sath V Perungavoor
(74) *Attorney, Agent, or Firm* — Nokia Technologies Oy

(57) ABSTRACT

According to an example aspect of the present disclosure, there is provided an apparatus configured for applying a stationary motion noise high-pass filter to at least one chronological frame-rate stream of motion vectors, to generate a high-pass filtered stream of motion vectors, to apply a short-term low-pass filter to the high-pass filtered stream of motion vectors to generate a low-pass and high-pass filtered stream of motion vectors, and, for applying a band-pass filter to the low-pass and high-pass filtered stream of motion vectors, to generate a band-pass filtered stream of motion vectors, wherein the band-pass filter is configured to distinguish short-term moving activity and means for detecting whether at least one event is present based on the low-pass and high-pass filtered stream of motion vectors and the band-pass filtered stream of motion vectors.

14 Claims, 5 Drawing Sheets

(56) References Cited

U.S. PATENT DOCUMENTS

| | | | | |
|---|---|---|---|---|
| 2009/0167778 | A1* | 7/2009 | Wei | G09G 5/14 348/E5.062 |
| 2010/0235033 | A1 | 9/2010 | Yamamoto et al. | |
| 2016/0205323 | A1* | 7/2016 | Jiang | G06T 7/223 348/208.4 |
| 2018/0285633 | A1 | 10/2018 | Alcock et al. | |
| 2020/0184652 | A1 | 6/2020 | Norris | |

OTHER PUBLICATIONS

Y.-M. Chen and I. V. Bajic, "Motion Vector Outlier Rejection Cascade for Global Motion Estimation," in IEEE Signal Processing Letters, vol. 17, No. 2, pp. 197-200, Feb. 2010, doi: 10.1109/LSP.2009.2036879. (Year: 2010).*

M. Okade and P. K. Biswas, "A novel motion vector outlier removal technique based on adaptive weighted vector median filtering for global motion estimation," 2013 Annual IEEE India Conference (INDICON), Mumbai, India, 2013, pp. 1-5, doi: 10.1109/INDCON.2013.6726121. (Year: 2013).*

J. Gamec, "Various filtering methods of motion vector fields," 2008 15th International Conference on Systems, Signals and Image Processing, Bratislava, Slovakia, 2008, pp. 519-522, doi: 10.1109/IWSSIP.2008.4604480. (Year: 2008).*

A. M. A. Ahmad, Duan-Yu Chen and Suh-Yin Lee, "Robust object detection using cascade filter in MPEG videos," Fifth International Symposium on Multimedia Software Engineering, 2003. Proceedings., Taichung, Taiwan, 2003, pp. 196-203, doi: 10.1109/MMSE.2003.1254442. (Year: 2003).*

M. Okade and P. K. Biswas, "Mean shift clustering based outlier removal for global motion estimation," 2013 Fourth National Conference on Computer Vision, Pattern Recognition, Image Processing and Graphics (NCVPRIPG), Jodhpur, India, 2013, pp. 1-4, doi: 10.1109/NCVPRIPG.2013.6776219. (Year: 2013).*

M. Okade and P. K. Biswas, "Fast Video Stabilization in the Compressed Domain," 2012 IEEE International Conference on Multimedia and Expo, Melbourne, VIC, Australia, 2012, pp. 1015-1020, doi: 10.1109/ICME.2012.113. (Year: 2012).*

Lawrence O'Gorman . Activity Analytics from Fixed Cameras for Robot Path Planning. TechRxiv. Jun. 6, 2022. DOI: 10.36227/techrxiv.19963238.v1 (Year: 2022).*

Fortun et al., "Optical flow modeling and computation: a survey", Computer Vision and Image Understanding, vol. 134, 2015, pp. 1-26.

Wang et al., "Unsupervised activity perception in crowded and complicated scenes using hierarchical Bayesian models", IEEE Transactions on Pattern Analysis and Machine Intelligence, vol. 31, No. 3, Mar. 2009, pp. 539-555.

Kratz et al., "Anomaly detection in extremely crowded scenes using spatio-temporal motion pattern models", IEEE Conference on Computer Vision and Pattern Recognition, Jun. 20-25, 2009, pp. 1446-1453.

Saleemi et al., "Scene understanding by statistical modeling of motion patterns", IEEE Computer Society Conference on Computer Vision and Pattern Recognition, Jun. 13-18, 2010, pp. 2069-2076.

Ren et al., "Faster R-CNN: Towards Real-Time Object Detection with Region Proposal Networks", arXiv, Jun. 4, 2015, pp. 1-10.

Redmon et al., "YOLOv3: An Incremental Improvement", arXiv, Apr. 8, 2018, 6 pages.

Zhao et al., "Object Detection with Deep Learning: A Review", IEEE Transactions on Neural Networks and Learning Systems, vol. 30, No. 11, Nov. 2019, pp. 3212-3232.

O'Gorman, "Activity Analytics from Fixed Cameras for Robot Path Planning", TechRxiv, 2022, pp. 1-10.

O'Gorman et al., "Motion feature filtering for event detection in crowded scenes", Pattern Recognition and Crowd Analysis, 2013, 14 pages.

Office action received for corresponding Finnish Patent Application No. 20225367, dated Dec. 20, 2022, 11 pages.

Zhang et al., "Real-Time Action Recognition With Deeply Transferred Motion Vector CNNs", IEEE Transactions on Image Processing, vol. 27, No. 5, May 2018, pp. 2326-2339.

Wada et al., "Building Human Motion Map for Mobile Robot in the Indoor Dynamic Environment", IEEE International Conference on Robotics and Biomimetics, Dec. 14-18, 2010, pp. 543-548.

Abed et al., "A Review on Path Planning Algorithms for Mobile Robots", Engineering and Technology Journal, vol. 39, Part A, No. 05, 2021, pp. 804-820.

Extended European Search Report received for corresponding European Patent Application No. 23169798.8, dated Sep. 27, 2023, 14 pages.

O'Gorman, "Temporal Filter Parameters for Motion Pattern Maps", 24th International Conference on Pattern Recognition (ICPR), Aug. 20-24, 2018, pp. 2612-2617.

Vetterli et al., "Wavelets and Filter Banks: Theory and Design", IEEE Transactions on Signal Processing, vol. 40, No. 09, Sep. 1992, pp. 2207-2232.

Office Action received for corresponding European Patent Application No. 23169798.8, dated Oct. 21, 2025, 10 pages.

* cited by examiner

ACTIVITY DETECTION USING VIDEO ANALYSIS

FIELD

Various example embodiments relate in general to video analysis and more specifically, activity detection using video analysis.

BACKGROUND

The term "activity detection" may refer to methods, wherein motion is detected along with some attributes of that motion, such as magnitude and direction. For instance, activity detection methods may have spatial resolution so that variation in motion within a field of view of a camera can be detected, i.e., an activity map. Activity detection may be performed by exploiting object detection and objection detection, i.e., detection of an object by its class and location, may be further performed using neural network to achieve high accuracy. However, the use of neural networks requires a lot of computing resources which is a problem, e.g., if real-time video processing is required or if computing resources of a device are limited. There is therefore a need to provide enhanced methods, apparatuses and computer programs for performing activity detection via video analysis, like via lower-computation video analysis methods.

SUMMARY

According to some aspects, there is provided the subject-matter of the independent claims. Some example embodiments are defined in the dependent claims.

The scope of protection sought for various example embodiments of the disclosure is set out by the independent claims. The example embodiments and features, if any, described in this specification that do not fall under the scope of the independent claims are to be interpreted as examples useful for understanding various example embodiments of the disclosure.

According to a first aspect of the present disclosure, there is provided an apparatus comprising means for applying a stationary motion noise high-pass filter to at least one chronological frame-rate stream of motion vectors, to generate a high-pass filtered stream of motion vectors, wherein the stationary motion noise high-pass filter is configured to filter out low frequency stationary motion noise that occurs in-place and in a sequence of frames for a duration of time that is larger than activity of interest, means for applying a short-term low-pass filter to the high-pass filtered stream of motion vectors to generate a low-pass and high-pass filtered stream of motion vectors, wherein the short-term low-pass filter is configured to retain short-term activity in-place, means for applying a band-pass filter to the low-pass and high-pass filtered stream of motion vectors to generate a band-pass filtered stream of motion vectors, wherein the band-pass filter is configured to distinguish short-term moving activity, and means for detecting whether at least one event is present based on the low-pass and high-pass filtered stream of motion vectors and the band-pass filtered stream of motion vectors.

Example embodiments of the first aspect may comprise at least one feature from the following bulleted list or any combination of the following features:

the apparatus further comprises means for retrieving at least one isochronal frame-rate stream of motion vectors from a storage, means for combining the at least one isochronal frame-rate stream of motion vectors and the high-pass filtered stream of motion vectors, to generate a combined frame-rate stream of motion vectors and means for applying a long-term low-pass filter to the combined frame-rate stream of motion vectors, to generate a long-term activity frame-rate stream of motion vectors;

the apparatus further comprises means for storing the long-term activity frame-rate stream of motion vectors;

wherein the long-term low-pass filter is configured to filter out irregular shot noise;

the apparatus further comprises means for using the long-term activity stream for offline global planning of a path of a robot;

wherein the band-pass filtered stream is a short-term activity stream and the apparatus further comprises means for using the short-term and long-term activity streams for real-time global planning of a path of a robot;

wherein the band-pass filtered stream is a short-term activity stream and the apparatus further comprises means for using the short-term activity stream for local planning of a path of a robot;

wherein said means for applying the band-pass filter comprises subtracting the high-pass filtered stream of motion vectors from the low-pass filtered stream of motion vectors, to generate a short-term moving activity stream of motion vectors and applying another low-pass filter to the short-term moving activity stream of motion vectors, to generate the band-pass filtered stream of motion vectors;

wherein said another low-pass filter is configured to filter out infrequent noise;

wherein said low frequency stationary motion noise that occurs in-place and in the sequence of frames occurs between all of the sequence of frames of the at least one chronological frame-rate stream of motion vectors at the same locations of the frames;

wherein the short-term low-pass filter is configured to filter out activity that occurs between at least two subsequent frames, but not all, of the at least one chronological frame-rate stream of motion vectors at different locations of the at least two subsequent frames;

wherein said infrequent noise that occurs in-place and in short term occurs between at least two subsequent frames, but not all, of the at least one chronological frame-rate stream of motion vectors at the same locations of the at least two subsequent frames;

the apparatus further comprises means for transmitting, upon detecting that the at least one event is present, at least one frame in which activity is detected to an object detection apparatus or function.

According to a second aspect, there is provided a method comprising, applying a stationary motion noise high-pass filter to at least one chronological frame-rate stream of motion vectors, to generate a high-pass filtered stream of motion vectors, wherein the stationary motion noise high-pass filter is configured to filter out low frequency stationary motion noise that occurs in-place and in a sequence of frames for a duration of time that is larger than activity of interest, applying a short-term low-pass filter to the high-pass filtered stream of motion vectors to generate a low-pass and high-pass filtered stream of motion vectors, wherein the short-term low-pass filter is configured to retain short-term activity in-place, applying a band-pass filter to the low-pass and high-pass filtered stream of motion vectors to generate a band-pass filtered stream of motion vectors, wherein the band-pass filter is configured to distinguish short-term moving activity and detecting whether at least one event is present based on the low-pass and high-pass filtered stream of motion vectors and the band-pass filtered stream of motion vectors.

According to a third aspect of the present disclosure, there is provided an apparatus comprising at least one processing core, at least one memory including computer program code, the at least one memory and the computer program code being configured to, with the at least one processing core, cause the apparatus at least to apply a stationary motion noise high-pass filter to at least one chronological frame-rate stream of motion vectors, to generate a high-pass filtered stream of motion vectors, wherein the stationary motion noise high-pass filter is configured to filter out low frequency stationary motion noise that occurs in-place and in a sequence of frames for a duration of time that is larger than activity of interest, apply a short-term low-pass filter to the high-pass filtered stream of motion vectors to generate a low-pass and high-pass filtered stream of motion vectors, wherein the short-term low-pass filter is configured to retain short-term activity in-place, apply a band-pass filter to the low-pass and high-pass filtered stream of motion vectors to generate a band-pass filtered stream of motion vectors, wherein the band-pass filter is configured to distinguish short-term moving activity and detect whether at least one event is present based on the low-pass and high-pass filtered stream of motion vectors and the band-pass filtered stream of motion vectors.

According to a fourth aspect of the present disclosure, there is provided a non-transitory computer readable medium having stored thereon a set of computer readable instructions that, when executed by at least one processor, cause an apparatus to at least to perform the method.

According to a fifth aspect of the present disclosure, there is provided a computer program comprising instructions which, when the program is executed by an apparatus, cause the apparatus to carry out the method.

EXAMPLE EMBODIMENTS

Activity detection using video analysis may be enhanced by the procedures described herein. More specifically, a filter cascade approach is provided for activity detection, wherein a cascade of temporal filters may be used to process at least one frame-rate stream of motion vectors. A motion vector may be defined as a vector comprising for example density, which is the magnitude of motion, direction, the direction of motion, velocity and/or dwell. An incoming video may comprise at least one chronological frame-rate stream of motion vector and the cascade of filters, comprising for example a high-pass filter, low-pass filter and band-pass filter, may be applied in sequence, and based on the outcome it may be detected whether at least one event is present. Therefore, computational efficiency, and possibly architectural advantages as well, can be achieved for activity detection, compared to for example object detection using neural network processing. Such enhancements may be beneficial at least for robot path planning and surveillance/security applications, and for many other applications as well.

Figure 1:
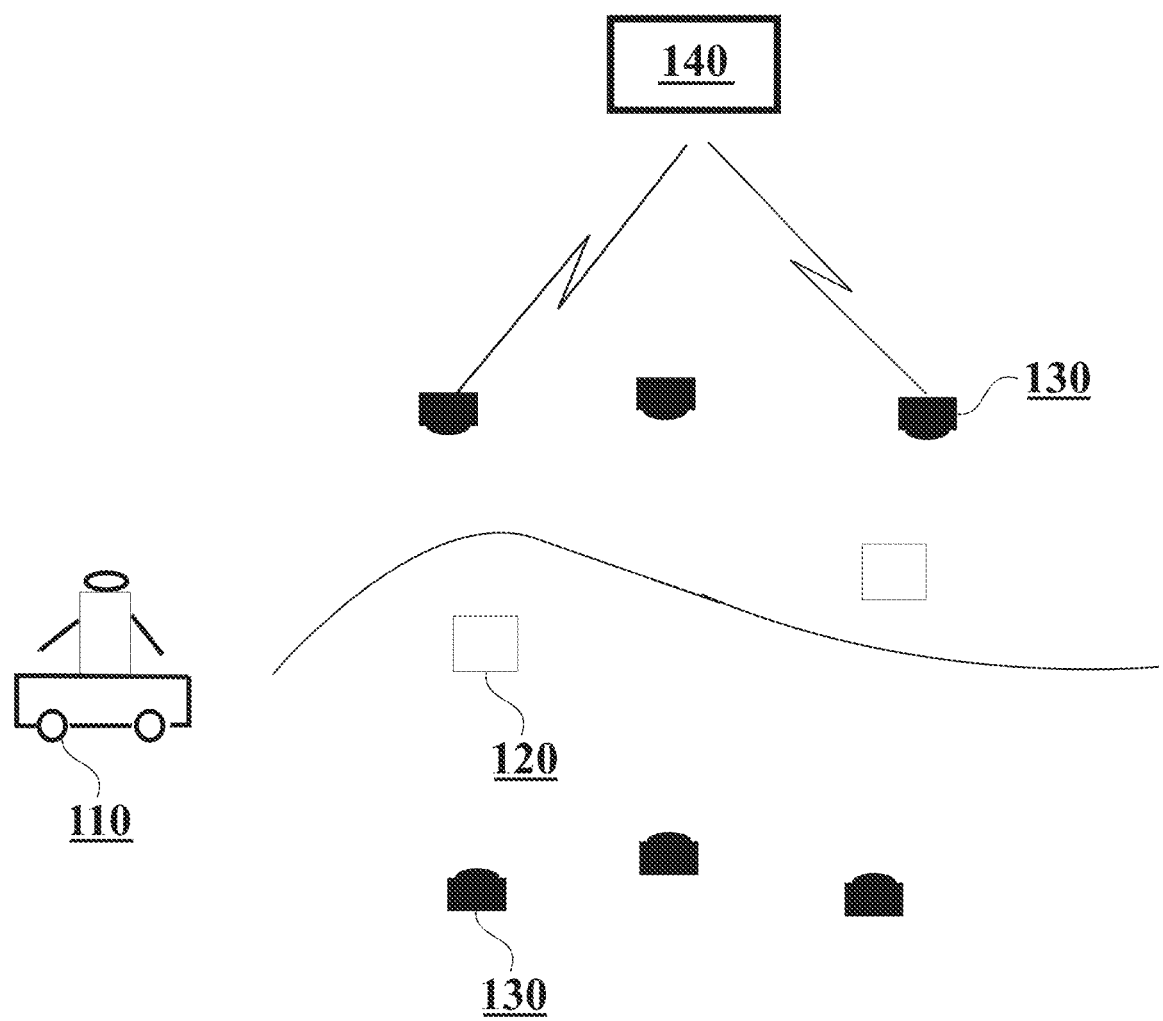
FIG. 1 illustrates an example scenario in accordance with at least some example embodiments.

FIG. 1 illustrates an example scenario in accordance with at least some example embodiments. According to the example scenario of FIG. 1, there may be robot 110, one or more obstacles 120, one or more cameras 130 and apparatus 140. Robot 110 may be a moving robot and hence it would be beneficial to plan the path of robot 110 such that obstacles 120, like walls, stairs, humans, etc., can be avoided. Video streams of cameras 130 may be exploited for estimating the presence of obstacles 120, and for activity detection as well. Cameras 130 may transmit the video streams to apparatus 140 for further processing, for example via an air interface as shown in FIG. 1, or via wired interface.

Cameras 130 and apparatus 140 may communicate, e.g., via a cellular connection using a Radio Access Technology, RAT, like Long Term Evolution, LTE, New Radio, NR, which may also be known as fifth generation, 5G, radio access technology and MulteFire. Alternatively, cameras 130 and apparatus 140 may communicate via a non-cellular connection using a non-cellular RAT, like Wireless Local Area Network, WLAN, or Worldwide Interoperability for Microwave Access, WiMAX. In any case, example embodiments of the present disclosure are not restricted to any particular wireless or wired technology. Instead, example embodiments may be exploited using any communication network.

One task in video analysis is activity detection in which a video stream may be continuously processed for detecting movement of interest. Activity detection may be performed using object detection. The purpose of objection detection is in general to find an object in a video frame, like obstacle 120 shown in FIG. 1, and the appearance or movement of the object between frames may signal activity. Object detection may be performed with neural network processing to achieve high accuracy. Although high object detection accuracy may be achieved using neural network processing, computing resources required for neural network processing are also very high. This creates a problem in various applications, for example if real-time video processing is required as it is for many video applications, because processing at a 30 frames per second rate (standard video rate) requires fast and powerful computing. For this reason, a Graphics Processing Unit, GPU, in addition to a Central Processing Unit, CPU, would need to be used for most video object detection applications. The problem with this is that the hardware and energy consumption cost for GPU computing may be in the range of 20× higher than that for CPU processing alone.

Embodiments of the present invention may be exploited for, but are not limited to, planning a path of a mobile robot, like robot 110 of FIG. 1. In case of robot path planning, the main objects of interest may be people, and in such a case the objective may be to perform path planning with the knowledge of where people are for the purpose of selecting a path that is both safe and efficient. As said, object detection may be performed using neural network processing, in this case for example to find people by capturing video from a camera either on-board the robot or a fixed (or infrastructure) camera. However, regardless of whether processing of the video is performed on-board or in the cloud, doing that using neural network processing in real-time would require compute-expensive GPU processing.

Motion detection may be differentiated from activity detection as follows. Motion detection may be considered the most rudimentary form of activity detection, wherein a simple a binary determination is made of whether or not there is activity in a frame. Motion detectors may use for example passive infrared sensor technology, to sense a change of temperature in the range of the sensor. Motion detection may also be performed using standard cameras, e.g., by using an optical flow calculation to measure movement of pixels between video frames. Such motion detectors may yield a binary determination of motion/no-motion only but not information on the type of motion, the type of objects creating the motion, or attributes such as direction, signal magnitude, or area size.

Activity detection may be used for those methods that detect motion along with some attributes of that motion, such as magnitude and direction. Activity detection methods may also have spatial resolution so that they can detect variation in motion within the camera's field of view (i.e., an activity map). Activity detection may be performed using computer vision algorithms that are built upon, or similar to, optical flow algorithms, but yield higher-level features such as direction, velocity and dwell, but not any information on individual objects or people (their number, type, etc.). Instead, the information may only be of pixel motion or group-of-pixel motion, i.e., an area of pixels.

Neural network object detection may be used to detect and classify objects. Although object detection methods, per se, may be used only to detects objects in static images, such methods may also be applied to each frame of a video stream and measure a change of location of detected objects between frames to determine activity.

Embodiments of the present disclosure relate to activity detection in general. More specifically, embodiments of the present disclosure enable fast and computationally efficient activity detection by using a temporal filter cascade to extract and classify different types of activity that may not be found, or may be found less efficiently, using other activity detection methods.

For many use cases, where activity is of interest, activity detection provides a less expensive option than the use of object detection. In case of activity detection, the presence and motion of people and moving objects may be detected, but not the individual people/objects themselves. Activity detection may be performed by first detecting activity features and then using a temporal filter cascade to determine if these features describe events of interest. For many applications, such as the exemplary use case of robot path planning, activity detection may be used to determine all the information that is needed, at a much lower cost compared to object detection using neural network processing. In some other cases, object detection may be needed, but instead of performing object detection on the continuous video stream, activity detection may be performed by processing that stream first and only pass on the video frames of interest. That is, activity detection may be used as a prefilter, or gate, for full object detection at a much lower cost.

The filter cascade approach has a device advantage as well. Instead of each edge unit (camera or robot, etc.) having its own GPU, an on-board device containing a filter cascade may perform activity detection at far less cost. In the event that the on-board device indicates a need for object detection, then the on-board device may send selected video frames to the cloud for GPU-processing. This substantially reduces GPU computation in the cloud as well as edge-to-cloud bandwidth, and the device can be low-cost, low-power, and low-size as is desired for an edge unit.

In some example embodiments, the processing of video frames may be performed in two time dimensions, chronological and isochronal. Chronological time is the time dimension, wherein each second is one second after the previous second. Isochronal time is different as it recognizes that events often occur in a regular cycle, such as traffic rush hour each weekday morning, busy school hallways during regular class change times, etc. For isochronal time, the sample before the current second may be the same second of the previous day. For example, an isochronal time sequence would be: 9:15 today, 9:15 yesterday, 9:15 two days ago, etc. Isochronal time series may be useful for example when it is desirable to use the statistics of what normally happens at a certain time. For instance, it may be beneficial to learn that at shift changes in a factory, certain hallways have increased people travel in certain directions, so a path plan of a robot should not send a robot in the opposite direction during these times.

In some example embodiments, different activity types may be exploited. Said activity types may comprise for example long-term, short-term in-place and short-term moving. Video analytics activity may be distinguished by a timeframe and type, sometimes called multi-band. Long-term activity may happen regularly in isochronal time, e.g., each day during lunch the cafeteria is crowded. Short-term activity cannot be predicted in isochronal time, since it may happen irregularly, e.g., sometimes the meeting room is crowded at 1-2 pm, sometimes at 2-3 pm, etc. In-place activity is activity that occurs in a defined space or location. In-place activity can describe a crowd of people dwelling in the same location, or it can be activity that happens in the same place, but by different people, such as the exit of a cafeteria that is busy with different people passing through that area.

In some example embodiments, planning types for planning a path of a robot may comprise global off-line, global real-time and local. Global off-line path planning may be performed at a time before navigation is performed, and long-term isochronal activity data only may be used for it (not current data, which is not yet available). An example is planning the time when a robot delivers parts each morning to avoid shift changes. Global real-time path planning may be performed at the time just before and during robot navigation. Global real-time path planning uses both long-term isochronal activity data and short-term current activity data across the entire planned route and may adjust the global path plan based upon current information. Local path planning examines activity very close to the robot (i.e., not along the entire, global, route). This uses the most up-to-date and closest short-term activity information to adjust the navigation path.

Figure 2:
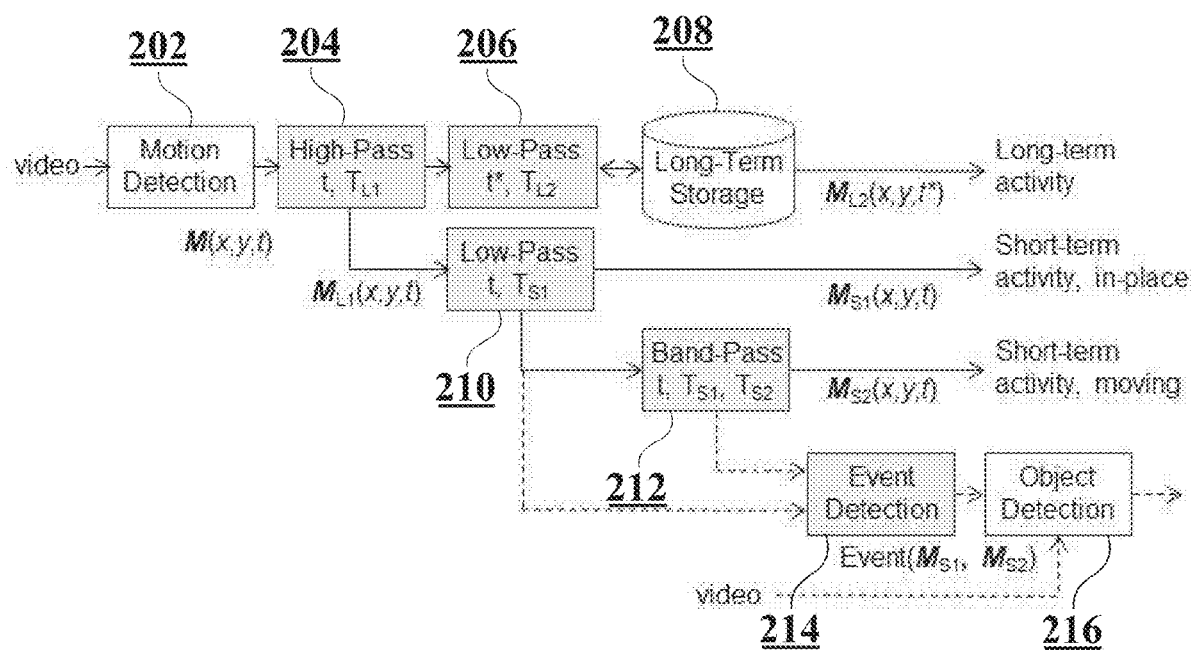
FIG. 2 illustrates a functional diagram in accordance with at least some example embodiments.

FIG. 2 illustrates a functional diagram in accordance with at least some example embodiments. More specifically, FIG. 2 illustrates a functional diagram showing filter cascade and event detection.

Motion detection may be performed by motion detection apparatus/function 202 on an incoming video. Motion detection apparatus/function 202 may transform the video into at least one chronological frame-rate stream of motion vector M(x, y, t) and transmit the at least one chronological frame-rate stream of motion vector M(x, y, t) to stationary motion noise high-pass filter 204 ($F_{L1}$). For instance, the at least one chronological frame-rate stream of motion vector M(x, y, t) may be transmitted, by motion detection apparatus/function 202, to stationary motion noise high-pass filter 204 ($F_{L1}$) via a communication network, such as a cellular or non-cellular communication network if motion detection apparatus/function 202 and stationary motion noise high-pass filter 204 ($F_{L1}$) are in devices.

Filtering may begin by applying stationary motion noise high-pass filter 204 ($F_{L1}$) to the at least one chronological frame-rate stream of motion vector of the video, to generate a high-pass filtered stream of motion vectors $M_{L1}(x, y, t)$ as follows $$M(x,y,t)*F_{L1} \rightarrow M_{L1}(x,y,t). \qquad (1)$$

The filter time constant $T_{L1}$ of stationary motion noise high-pass filter 204 may be chosen to reduce low frequency "stationary motion noise", i.e., motion that may occur in-place and continuously such as from rustling tree leaves or a flashing light, while keeping the higher frequency activity signal. That is, stationary motion noise high-pass filter 204 may be configured to filter out low frequency stationary motion noise that occurs in-place and continuously or at least in a sequence of frames for a duration of time that is larger than activity of interest. That is, continuously may refer to a long time, but not infinity. In some example embodiments, said low frequency stationary motion noise may occur in-place and in the sequence of frames occurs between all the frames of the at least one chronological frame-rate stream of motion vectors at the same locations of the frames.

Stationary may refer to noise that is static in location, but constant in time, i.e., constant in a time duration over some threshold. Examples comprise at least waves on a pond, a flag waving, a blinking light, leaves rustling, etc. In all of these cases, this is motion, but because it is always happening it is not of interest. The stationary filter parameter, $T_{L1}$, may be chosen to eliminate noise that is, for example, longer than 20 seconds or so. So a flapping flag doesn't need to go continuously day and night, but just for some time that you know it's not of interest.

That is, said low frequency stationary motion noise may not necessarily occur in all the frames. Said noise may occur at one location in a sequence of frames for some duration of time that is much longer than activity of interest. For instance, if we choose maximum dwell time to be 10 minutes, then any activity that is at the same location longer than 10 minutes may be, by definition, stationary. Note also that "location" may be a group of pixels that have the same location from one frame to another. The size of "location" may be just a few pixels (as for instance a blinking light) to a large portion of the image, such as waves on an ocean. A more precise term for "location" may be "pixel coordinates", however, one should be aware that it doesn't have to be exact pixel coordinates, just pixel coordinates that overlap over a period of time.

The high-pass filtered stream of motion vectors $M_{L1}(x, y, t)$ may be fed from stationary motion noise high-pass filter 204 to long-term low-pass filter 206. At least one isochronal frame-rate stream of motion vectors may be retrieved from storage 208 and the at least one isochronal frame-rate stream of motion vectors and the high-pass filtered stream of motion vectors may be combined, to generate a combined frame-rate stream of motion vectors. That is, the result of equation (1), i.e, $M_{L1}(x, y, t)$, may be combined with the at least one isochronal motion vector retrieved from storage 208, the at least one isochronal motion vector corresponding to time t=t* (i.e., chronological time equals isochronal time), to generate a combined frame-rate stream of motion vectors. Then, long-term low-pass filter 206 may be applied to the combined frame-rate stream of motion vectors, to generate a long-term activity frame-rate stream of motion vectors. The resultant, long-term activity frame-rate stream of motion vectors $M_{L2}(x, y, t*)$ may be then stored, e.g., by transmitting it to storage 208. The long-term activity frame-rate stream of motion vectors may be used for determining long-term activity. The long-term activity frame-rate stream of motion vectors $M_{L2}(x, y, t*)$ may be generated as follows $$M_{L1}(x,y,t*)*F_{L2} \rightarrow M_{L2}(x,y,t*) \qquad (2)$$

Hence, long-term activity may be updated in isochronal time, for example 1 sample per day for each t*, 0<t*<1440, where 1440 may be the number of minutes in a day. The filter time constant $T_{L2}$ of long-term low-pass filter 206 may be chosen to reduce irregular (shot) noise. That is, long-term low-pass filter 206 may be configured to filter out irregular shot noise.

Shot noise is one of the most basic types of noise, which for an image may be just a pixel that has a high (or low) value different from its adjacent (in time) pixels for a very short time, as few as 1 frame. The most basic type of low-pass filter, a smoothing filter, is used to attenuate this shot noise. So if shot noise at a pixel is 100 and the previous and later values at the same pixel are 50, then a smoothing pixel may average, e.g., (50+50+100+50+50)/5 to reduce the value at the shot noise pixel.

Short-term low-pass filter 210 ($F_{S1}$) may be applied to the high-pass filtered stream of motion vectors to generate a low-pass and high-pass filtered stream of motion vectors. Short-term low-pass filter 210 may be applied to identify short-term, in-place activity, i.e., configured to retain short-term activity in-place. Short-term low-pass filter 210 may be configured to filter out moving activity that occurs across locations and in short term. That is, short-term, in-place activity may be identified by applying short-term low-pass filter 210 to the high-pass filtered stream of motion vectors $M_{L1}(x, y, t)$ as follows, to generate the low-pass and high-pass filtered stream $M_{S1}(x, y, t)$ $$M_{L1}(x,y,t)*F_{S1} \rightarrow M_{S1}(x,y,t) \qquad (3)$$

The filter time constant $T_{S1}$ of short-term low-pass filter 210 may be chosen to capture people activity in the same location, and eliminate people moving across locations. That is, short-term low-pass filter 210 may be configured to filter out activity that occurs between at least two subsequent frames, but not all, of the at least one chronological frame-rate stream of motion vectors at different locations of the at least two subsequent frames. In some example embodiments, short-term activity, in-place may be determined using the low-pass and high-pass filtered stream of motion vectors.

Short-term low-pass filter 210 may be configured to retain activity that is static in location (e.g., people who are standing by the water cooler, though they may move their hands and bodies, they stay in roughly the same location), and to remove activity that changes location (so the motion of a person walking past these people at the water cooler would be removed by this filter).

Band-pass filter 212 may be applied to the low-pass and high-pass filtered stream of motion vectors to generate a band-pass filtered stream of motion vectors, thereby providing a more selective band pass filter result, so it is choosing a particular portion of the previous low-pass and high pass filtered result. Band-pass filter 212 may be configured to filter out infrequent noise that occurs in-place and in short term. In some example embodiments, applying band-pass filter 212 may comprise subtracting the high-pass filtered stream of motion vectors $M_{L1}(x, y, t)$ from the low-pass filtered stream of motion vectors $M_{S1}(x, y, t)$, to generate a short-term moving activity stream of motion vectors $M_{S2}(x, y, t)$ and applying another low-pass filter to the short-term moving activity stream of motion vectors.

That is, short-term, moving activity may be identified using band-pass filter 212. The low end of band-pass filter 212 may be configured, or set, as $T_{S1}$ and the high end may be $T_{S2}$. The time constant $T_{S1}$ may separate the signal from in-place activity and $T_{S2}$ may remove high-frequency, infrequent noise. Said another low-pass filter may be configured to filter out infrequent noise. Said infrequent noise that occurs in-place and in short term occurs between at least two subsequent frames, but not all, of the at least one chronological frame-rate stream of motion vectors at the same locations of the at least two subsequent frames.

The high-frequency end of band-pass filter 212 for "short-term activity moving" is $f(T_{S2})$, which may be lower than the previous noise reduction filter cutoff of $f(T_{L2})$, which means that at this point in the cascade, it would be possible to get rid of a little more of the high frequency noise.

Short-term, moving activity may be determined by subtracting $M_{S1}$ from $M_{L1}$ to rid the in-place activity (effectively a high-pass filter) and then applying said another low-pass filter to rid infrequent noise. For example, the low-pass filtering component may be found by averaging (Finite Impulse Response, FIR, filter) frames at full frame rate over 1 second. This combination may result in band-pass filtering as follows, to generate the band-pass filtered stream of motion vectors $M_{S2}(x, y, t)$.

$$(M_{L1}(x,y,t) - M_{S1}(x,y,t)) * F_{S2} \to M_{S2}(x,y,t) \quad (4)$$

Event detection apparatus/function 214 may detect whether at least one object is present based on the low-pass and high-pass filtered stream of motion vectors $M_{S1}(x, y, t)$ and the band-pass filtered stream of motion vectors $M_{S2}(x, y, t)$. Event detection may be performed on short-term, in-place and moving activity to act as a gate on more computationally expensive processing such as object detection, e.g., as follows $$\text{Event}(M_{S1}, M_{S2}) = 1, \text{ do object detection}$$
$$= 0, \text{ do nothing.}$$

The definition of an event may be application dependent, for instance based upon the size of activity, its location, direction, time, etc. The band-pass filtered stream of motion vectors, or at least one frame in which activity is detected, may be transmitted to object detection function/apparatus 216 for further processing upon detecting that the at least one event is present.

For instance, if the filtering in cascade has been performed and it has been determined that there is activity, the cascade filter does not identify the specific object that is moving, like a person, a robot or a cart. If only carts are of interest, the frame in which activity has been detected may be transmitted to object detection function/apparatus 216, which may be on-board or in the cloud. Object detection may refer to determining the class and location of an object. So the result in this case would tell whether a cart is the object of activity and its location.

In some example embodiments, apparatus 140 may comprise all functions and filters shown in FIG. 2. Alternatively, apparatus 140 may comprise for example all filters 204-206 and 210-212, and event detection apparatus/function 214. That is, apparatus 140 may be configured to perform the tasks of all filters 204-206 and 210-212, and event detection apparatus/function 214. In some example embodiments, apparatus 140 may comprise means for performing the tasks of all filters 204-206 and 210-212, and event detection apparatus/function 214. Filters 204-206 and 210-212 may be referred to as temporal filters in general. A temporal video filter cascade may comprise filters 206 and 210-212, and possibly filter 204 as well.

In some example embodiments, video streams may be captured from one or more fixed cameras, like cameras 130 in FIG. 1, and each video stream may be separated into 2 streams, isochronal and chronological. Temporal filters may then be applied in cascade to the isochronal stream to determine long-term activity and then to the chronological stream to determine short-term activity.

As an example, robot path planning may be performed on the temporal filter output using the long-term activity stream for offline global path planning, using the short- and long-term activity streams for real-time global path planning and/or using the short-term activity stream for local planning.

In some example embodiments, the temporal video filter cascade may be used on a video stream to extract activity information on two time axes, chronological and isochronal, and for 3 temporal durations, long-term, short-term in-place, and short-term moving.

In some example embodiments, the temporal video filter cascade may be used on a video stream to extract activity information on said two time axes and for 3 temporal durations to use in determination of a time period or spatial region in which there is activity of interest.

In some example embodiments, the temporal video filter cascade on a video stream may be used to detect activity of interest, and if that activity of interest warrants, to perform subsequent processing including object detection.

In some example embodiments, the temporal video filter cascade may be used on a video stream to detect activity, and to use that activity to perform path planning.

In some example embodiments, the temporal video filter cascade may be used on a video stream to detect activity, and to use that activity to perform alerting for surveillance applications.

In some example embodiments, the temporal video filter cascade may be used on a video stream from fixed (infrastructure) cameras located along prospective robot paths to detect activity, and to use that information for global off-line planning, global real-time planning, and local planning.

Example embodiments therefore provide computational efficiency advantages. The temporal filter cascade may be used to extract activity from a video stream, e.g., as follows. Activity detection may be a medium-level video analysis technique that is much more efficient than higher-level neural network object detection. Each stage of the filter cascade uses results from the previous filter, so that is more efficient than using a separate filter for each band. This includes filtering low-frequency, high-frequency, and stationary noise. In some example embodiments, this also includes long-term isochronal activity and short-term in-place and moving activity.

Activity detection may be often the end-goal of processing, as it is for the exemplary use case of robot path planning. If object detection is performed for the purpose of activity detection, it would require an extra processing step to go from static object detection to dynamic activity detection.

In some example embodiments, activity detection may not be a model-based processing method, and in such a case it would not require large memory storage. In contrast, neural networks for object detection may require in the order of 10s to 100s of Mbytes. Large memory sizes such as this may be undesirable in various applications, for example in edge units due to cost, power and size. This is particularly important for use cases that have many edge units, such as a security camera network or a factory camera network of 100s of cameras, or Camera networks for other applications, like fire detection, traffic, etc.

Example embodiments also provide architectural advantages, e.g., if a temporal filter cascade apparatus, like apparatus 140 in FIG. 1, is on-board an edge unit, such as a robot or smart camera. For instance, the temporal filter cascade apparatus on an edge unit may perform two functions efficiently. One is to detect activity, which may be the end-goal for some use cases. The other is to perform prefiltering to send video frames of interest to the cloud. Hence, cloud processing may be reduced, which must otherwise be performed for every frame. The other advantage of pre-filtering is to reduce bandwidth required if each edge unit sends the continuous video stream to the cloud. If many cameras are used in an application, this would incur a high bandwidth load as well as processing delays.

Embodiments of the present disclosure may be exploited in various applications. One exemplary use case is robot path planning, wherein a robot may for example navigate with respect to a cost map. The cost map may begin as a floor plan and a cost of navigation may be assigned for each area of the floor plan. For instance, if a robot cannot go through walls or down the stairs, those areas would be assigned the highest costs. Even if a robot could physically navigate through a certain area, it may be assigned a high cost for safety reasons, for instance for an area of a factory in which the public can enter may be forbidden for robot to travel.

Some cost maps may be static but if we desire, it may be desirable to have a cost map by which the robot could also avoid for example humans. In such a case, the cost map should also include dynamic events like people walking and standing in groups. Such a cost map may be done by exploiting activity detection, but processing speed should be fairly high, and temporal lag should be small, to produce time-relevant maps with respect to moving humans and moving robots. For this reason, the temporal filter cascade may produce multiple bands of people movement: long-term from isochronal data for global path planning, short-term in-place to locate groups of people standing in one place for some time (dwelling), and short-term moving to locate people who are moving. Each of these is treated differently in global and local path planning as described in this disclosure.

Another exemplary use case relates to surveillance and security cameras. For instance, the type of activity viewed by a surveillance or security camera may call for different actions, e.g., if activity detection in a retail store detects a larger than usual magnitude of activity in the checkout area, then this might be used to trigger a call for more cashiers sent to respond to this demand Long-term activity in isochronal time may be used to plan daily resources to respond to different loads at different times of the day. For security purposes, the response might be different between short-term moving activity and short-term in-place activity, the latter meaning that one or more people are loitering, which may be a security trigger in some cases. Loitering may have a negative connotation for security applications, but the same type of processing, i.e., the same filter may also detect "dwelling", which has a positive connotation for retail when people are dwelling in front of a marketing or product display.

Figure 3:
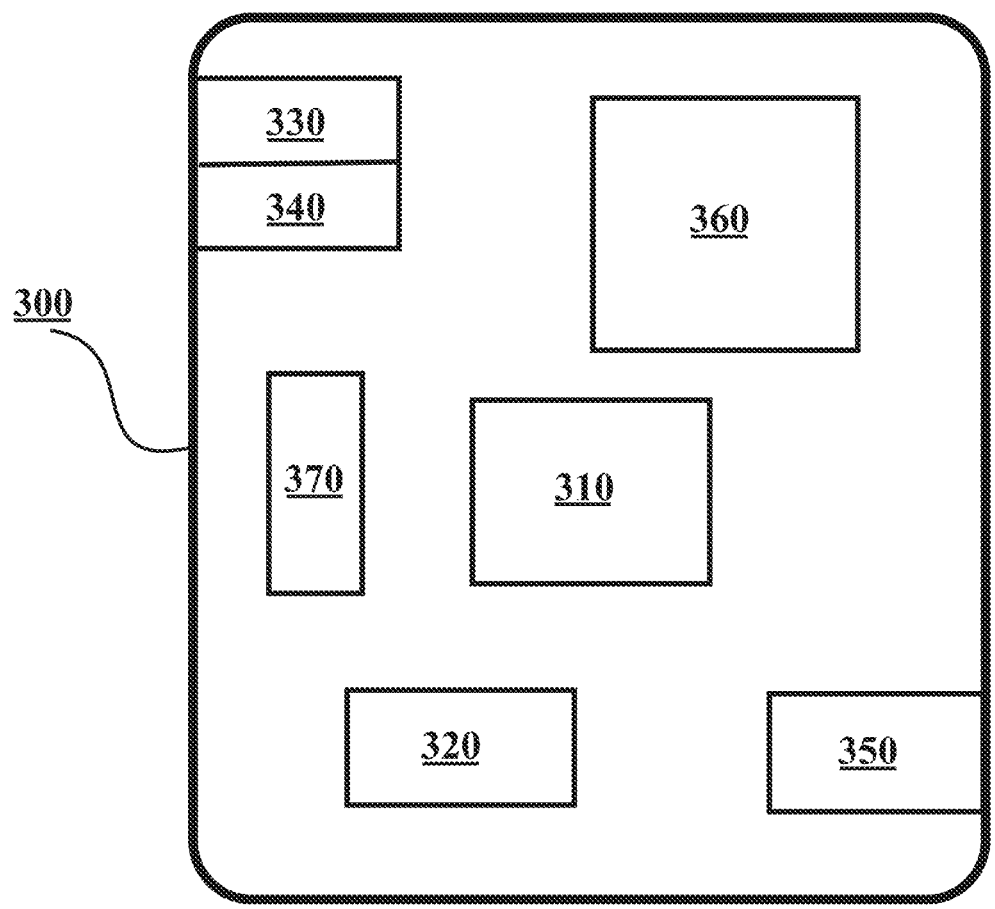
FIG. 3 illustrates an example apparatus capable of supporting at least some example embodiments.

FIG. 3 illustrates an example apparatus capable of supporting at least some example embodiments. Illustrated is device 300, which may comprise, for example, apparatus 140, or a control device configured to control the functioning thereof, possibly when installed therein. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Global System for Mobile communication, GSM, Wideband Code Division Multiple Access, WCDMA, Long Term Evolution, LTE, and/or 5G/NR standards, for example.

Device 300 may comprise a Near-Field Communication, NFC, transceiver 350. NFC transceiver 350 may support at least one NFC technology, such as Bluetooth, Wibree or similar technologies.

Device 300 may comprise User Interface, UI 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some example embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the example embodiment various ways of interconnecting at least two of the aforementioned devices may be selected without departing from the scope of the example embodiments.

Figure 4:
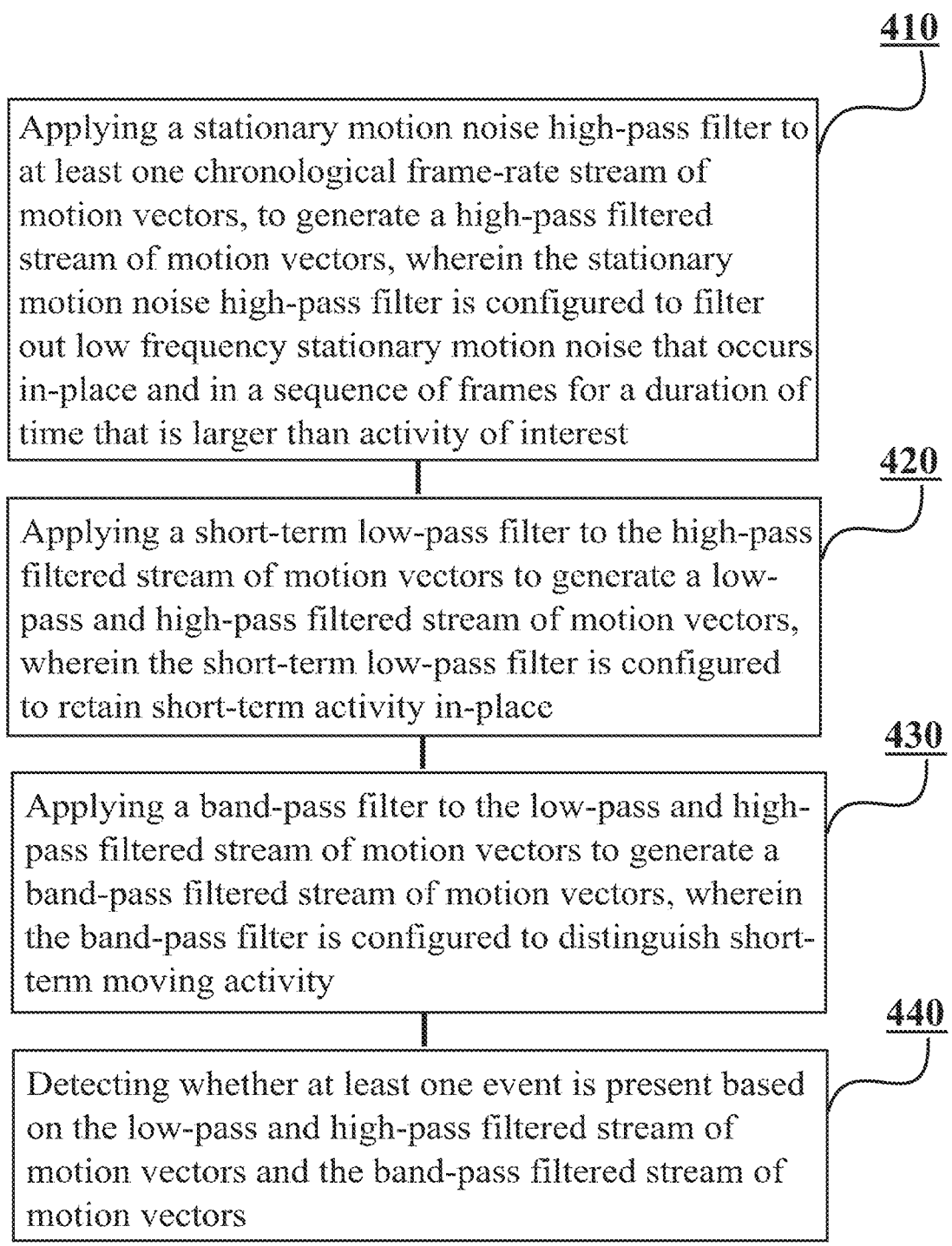
FIG. 4 illustrates a flow graph of a method in accordance with at least some example embodiments.

FIG. 4 is a flow graph of a first method in accordance with at least some example embodiments. The phases of the illustrated first method may be performed by apparatus 140 or by a control device configured to control the functioning thereof, possibly when installed therein.

The method may comprise, at step 410, applying a stationary motion noise high-pass filter to at least one chronological frame-rate stream of motion vectors, to generate a high-pass filtered stream of motion vectors, wherein the stationary motion noise high-pass filter is configured to filter out low frequency stationary motion noise that occurs in-place and in a sequence of frames for a duration of time that is larger than activity of interest. The method may also comprise, at step 420, applying a short-term low-pass filter to the high-pass filtered stream of motion vectors to generate a low-pass and high-pass filtered stream of motion vectors, wherein the short-term low-pass filter is configured to retain short-term activity in-place. Moreover, the method may comprise, at step 430, applying a band-pass filter to the low-pass and high-pass filtered stream of motion vectors to generate a band-pass filtered stream of motion vectors, wherein the band-pass filter is configured to distinguish short-term moving activity. Finally, the method may comprise, at step 440, detecting whether at least one event is present based on the low-pass and high-pass filtered stream of motion vectors and the band-pass filtered stream of motion vectors.

Figure 5:
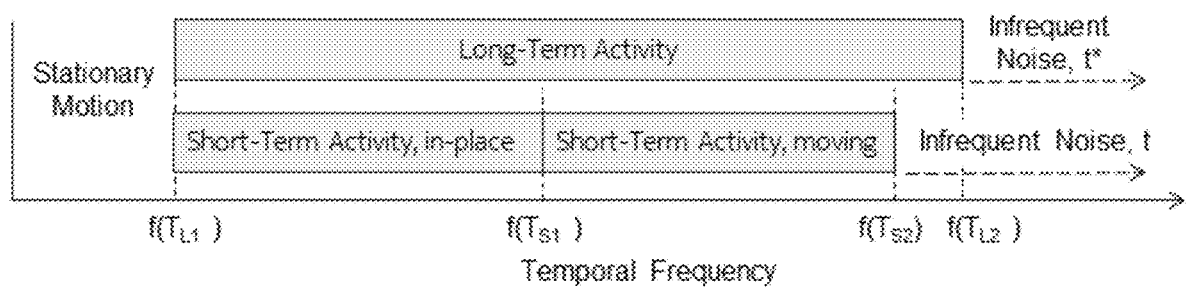
FIG. 5 illustrates temporal filter bands associated with activity types in accordance with at least some example embodiments.

FIG. 5 illustrates temporal filter bands associated with activity types in accordance with at least some example embodiments.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, such as, for example, apparatus 140, may comprise means for carrying out the example embodiments described above and any combination thereof.

In an example embodiment, a computer program may be configured to cause a method in accordance with the example embodiments described above and any combination thereof. In an example embodiment, a computer program product, embodied on a non-transitory computer readable medium, may be configured to control a processor to perform a process comprising the example embodiments described above and any combination thereof.

In an example embodiment, an apparatus, such as, for example, apparatus 140, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the example embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application in robot path planning and surveillance/security applications.

Acronyms List

3GPP 3rd Generation Partnership Project
CPU Central Processing Unit
FIR Finite Impulse Response
GPU Graphics Processing Unit
GSM Global System for Mobile communication
NR New Radio
UE User Equipment
UI User Interface
WCDMA Wideband Code Division Multiple Access
WiMAX Worldwide Interoperability for Microwave Access
WLAN Wireless Local Area Network

| REFERENCE SIGNS LIST | |
|---|---|
| 110 | Robot |
| 120 | Obstacle |
| 130 | Camera |
| 140 | Apparatus |
| 130 | Core Network |
| 202 | Motion detection apparatus/function |
| 204 | Stationary motion noise high-pass filter |
| 206 | Long-term low-pass filter |
| 208 | Storage |
| 210 | Short-term low-pass filter |
| 212 | Band-pass filter |
| 214 | Event detection apparatus/function |
| 216 | Object detection apparatus/function |
| 300-370 | Structure of the apparatus of FIG. 3 |
| 410-440 | Phases of the method in FIG. 4 |

The invention claimed is:

1. An apparatus, comprising at least one processing core, at least one memory including computer program code, the at least one memory and the computer program code being configured to, with the at least one processing core, cause the apparatus at least to:
   apply a stationary motion noise high-pass filter to at least one chronological frame-rate stream of motion vectors, to generate a high-pass filtered stream of motion vectors, wherein the stationary motion noise high-pass filter is configured to filter out low frequency stationary motion noise that occurs in-place and in a sequence of frames for a duration of time that is larger than activity of interest;
   apply a short-term low-pass filter to the high-pass filtered stream of motion vectors to generate a low-pass and high-pass filtered stream of motion vectors, wherein the short-term low-pass filter is configured to retain short-term activity in-place;
   apply a band-pass filter to the low-pass and high-pass filtered stream of motion vectors to generate a band-pass filtered stream of motion vectors, wherein the band-pass filter is configured to distinguish short-term moving activity; and
   detect whether at least one event is present based on the low-pass and high-pass filtered stream of motion vectors and the band-pass filtered stream of motion vectors.

2. An apparatus according to claim 1, wherein the at least one memory and the computer program code are configured to, with the at least one processing core, further cause the apparatus to:
   retrieve at least one isochronal frame-rate stream of motion vectors from a storage;
   combine the at least one isochronal frame-rate stream of motion vectors and the high-pass filtered stream of motion vectors, to generate a combined frame-rate stream of motion vectors; and apply a long-term low-pass filter to the combined frame-rate stream of motion vectors, to generate a long-term activity frame-rate stream of motion vectors.

3. An apparatus according to claim 2, wherein the at least one memory and the computer program code are configured to, with the at least one processing core, further cause the apparatus to store the long-term activity frame-rate stream of motion vectors.

4. An apparatus according to claim 2, wherein the long-term low-pass filter is configured to filter out irregular shot noise.

5. An apparatus according to claim 2, wherein the at least one memory and the computer program code are configured to, with the at least one processing core, further cause the apparatus to use the long-term activity stream for offline global planning of a path of a robot.

6. An apparatus according to claim 2, wherein the band-pass filtered stream is a short-term activity stream and wherein the at least one memory and the computer program code are configured to, with the at least one processing core, further cause the apparatus to use the short-term and long-term activity streams for real-time global planning of a path of a robot.

7. An apparatus according to claim 1, wherein the band-pass filtered stream is a short-term activity stream and wherein the at least one memory and the computer program code are configured to, with the at least one processing core, further cause the apparatus to use the short-term activity stream for local planning of a path of a robot.

8. An apparatus according to claim 1, wherein the at least one memory and the computer program code are configured to, with the at least one processing core, further cause the apparatus to apply the band-pass filter by subtracting the high-pass filtered stream of motion vectors from the low-pass filtered stream of motion vectors, to generate a short-term moving activity stream of motion vectors and apply another low-pass filter to the short-term moving activity stream of motion vectors, to generate the band-pass filtered stream of motion vectors.

9. An apparatus according to claim 8, wherein said another low-pass filter is configured to filter out infrequent noise.

10. An apparatus according to claim 1, wherein said low frequency stationary motion noise that occurs in-place and in the sequence of frames occurs between all of the sequence of frames of the at least one chronological frame-rate stream of motion vectors at the same locations of the frames.

11. An apparatus according to claim 1, wherein the short-term low-pass filter is configured to filter out activity that occurs between at least two subsequent frames, but not all, of the at least one chronological frame-rate stream of motion vectors at different locations of the at least two subsequent frames.

12. An apparatus according to claim 1, wherein said infrequent noise that occurs in-place and in short term occurs between at least two subsequent frames, but not all, of the at least one chronological frame-rate stream of motion vectors at the same locations of the at least two subsequent frames.

13. An apparatus according to claim 1, wherein the at least one memory and the computer program code are configured to, with the at least one processing core, further cause the apparatus to transmit, upon detecting that the at least one event is present, at least one frame in which activity is detected to an object detection apparatus or function.

14. A method, comprising:

applying a stationary motion noise high-pass filter to at least one chronological frame-rate stream of motion vectors, to generate a high-pass filtered stream of motion vectors, wherein the stationary motion noise high-pass filter is configured to filter out low frequency stationary motion noise that occurs in-place and in a sequence of frames for a duration of time that is larger than activity of interest;

applying a short-term low-pass filter to the high-pass filtered stream of motion vectors to generate a low-pass and high-pass filtered stream of motion vectors, wherein the short-term low-pass filter is configured to retain short-term activity in-place;

applying a band-pass filter to the low-pass and high-pass filtered stream of motion vectors to generate a band-pass filtered stream of motion vectors, wherein the band-pass filter is configured to distinguish short-term moving activity; and detecting whether at least one event is present based on the low-pass and high-pass filtered stream of motion vectors and the band-pass filtered stream of motion vectors.

* * * * *